(12) United States Patent
Ahammad et al.

(10) Patent No.: US 8,027,542 B2
(45) Date of Patent: Sep. 27, 2011

(54) HIGH SPEED VIDEO ACTION RECOGNITION AND LOCALIZATION

(75) Inventors: Parvez Ahammad, Berkeley, CA (US); Chuohao Yeo, Berkeley, CA (US); Kannan Ramchandran, El Cerrito, CA (US); S. Shankar Sastry, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 988 days.

(21) Appl. No.: 11/764,754

(22) Filed: Jun. 18, 2007

(65) Prior Publication Data

US 2008/0310734 A1    Dec. 18, 2008

(51) Int. Cl.
- G06K 9/48     (2006.01)
- G06K 9/36     (2006.01)
- G06K 9/00     (2006.01)
- H04N 5/14     (2006.01)
- H04N 7/12     (2006.01)
- H03F 1/26     (2006.01)

(52) U.S. Cl. ........ 382/197; 382/107; 382/236; 348/699; 375/240.16; 702/189

(58) Field of Classification Search .............. 382/209, 382/236, 107, 197; 348/699; 375/240.16; 702/189
See application file for complete search history.

(56) References Cited

U.S. PATENT DOCUMENTS 6,501,794 B1 * 12/2002 Wang et al. .............. 375/240.08
6,571,193 B1    5/2003 Unuma et al.

OTHER PUBLICATIONS

Efros et al.; "Recognizing Action at a Distance"; IEEE International Conference on Computer Vision, Nice, France; Oct. 2003; pp. 1-8.
Schuldt et al.; "Recognizing Human Actions: A Local SVM Approach" Computational Vision and Active Perception Lab (CVAP), Dept. of Numerical Analysis Comp. Science; pp. 1-5.
"Recognition of Human Acitons" http://www.nada.kth.se/cvap/actions; pp. 1-2.
Bahu et al.; "Compressed Domain Human Motion Recognition Using Motion History Information" Dept. of Electrical Engineering; ICASSP 2003; pp. III 41-44.
Shechtman et al.; "Space-Time Behavior Based Correlation" Dept. of Computer Science and Applied Math, The Weizmann Institute of Science; pp. 1-8.
Coimbra et al.; "Approximating Optical Flow within the MPEG-2 Compressed Domain"; pp. 1-16.
Ozer et al.: "Human Activity Detection in MPEG Sequences" IEEE 2000; 07695-0939-7/00; pp. 61-66.

(Continued)

*Primary Examiner* — Kathleen Y Dulaney
(74) *Attorney, Agent, or Firm* — Trellis IP Law Group, PC

(57) ABSTRACT

An apparatus for detecting an action in a test video. In an illustrative embodiment, the apparatus includes a first mechanism for receiving a query for a particular action via a query video. A second mechanism employs motion vectors associated with the test video to compute one or more motion-similarity values. The one or more motion-similarity values represent motion similarity between a first group of pixels in a first frame of a query video and a second group of pixels in a second frame of the test video based on the motion vectors. A third mechanism uses the one or more similarity values to search for the particular action or similar action in the test video. In a more specific embodiment, another mechanism aggregates the similarity values over a predetermined number of frames to facilitate estimating where the particular action or version thereof occurs or is likely to occur in the test video.

30 Claims, 9 Drawing Sheets

OTHER PUBLICATIONS

Chang et al.; "A Fully Automated Content-Based Video Search Engine Supporting Spatiotemporal Queries"; IEEE Transactions on Circuits and Systems for Video Technology, vol. 8 No. 5, Sep. 1998; pp. 602-615.

Srinivasan et al.; "'What is in that video anyway?': In Search of Better Browsing"; IEEE 1999; 07695-0253-9/99; pp. 388-393.

Wolfe, Jeremy M.; "Visual Search"; http://searchbwh.harvard.edu/Recent%20Projects/visual_search_review/Review.html; Jan. 11, 2002; pp. 1-41.

Bahu et al.; "Compressed Domain Action Classification Using HMM"; IEEE 2001; 07695-1354-9/01; pp. 44-49.

Laptev, Ivan; "Local Spatio-Temporal Image Features for Motion Interpretation"; KTN Numeral Analysis and Computer Sciences, Doctoral Thesis, Stockholm, Sweden 2001; pp. 1-148.

Yeo et al.; "Compressed Domain Real-time Action Recognition"; Department of Electrical and Computer Science, University of California, Berkeley; pp. 1-4.

* cited by examiner

HIGH SPEED VIDEO ACTION RECOGNITION AND LOCALIZATION

ACKNOWLEDGMENT OF GOVERNMENT SUPPORT

This invention was made with Government support under Contract Number CCR-0330514, awarded by the National Science Foundation (NSF). The Government may have certain rights to this invention.

BACKGROUND OF THE INVENTION

This invention is related in general to video processing and more specifically to action-recognition systems and methods for detecting or locating a particular action in a video. Generally, video action recognition systems compare actions in a query video to many reference videos to detect whether an action in the query video matches the action in a particular reference video. In this manner, a particular action such as, e.g., walking, running, jumping, throwing a punch, or other action performed by an animate or inanimate actor can be identified. Action-recognition systems can be employed in various demanding applications, including video surveillance, collision-avoidance for unmanned aerial vehicles, video editing, video piracy prevention, and viewing applications. Such applications often demand high-speed recognition of a particular action(s) occurring in a video.

High-speed action-recognition systems are particularly important in surveillance applications, where any delays in detecting a particular action may result in a security breach. In such applications, multiple videos are often displayed simultaneously on various monitors. Security personnel may wish to be alerted when a particular action in a video occurs. An action recognition system may alert security personnel to a desired video display when a particular action in the video is detected by the action-recognition system.

SUMMARY OF EMBODIMENTS OF THE INVENTION

Certain embodiments of the invention provide an apparatus for detecting or locating an action in a test video. In a specific embodiment, the apparatus includes a first mechanism for employing motion vector or field information to identify a predetermined characteristic of an action and to provide a first signal in response thereto. A second mechanism includes instructions for determining where in a video sequence a certain motion exists or is likely to exist based on the first signal.

In a more specific embodiment, the predetermined characteristic includes the motion that is associated with the action. The first mechanism further includes a third mechanism for determining a motion similarity between a first group of pixels in a first frame in a test video and a second group of pixels in a second frame in a query video. The query video includes a representation of the action, and the test video represents the video sequence.

In this embodiment, the motion similarity includes a similarity value that is based on differences in orientation and magnitude of motion vectors. Another mechanism computes a similarity value for various Space-Time (ST) sections in the test video based on the query video. The fourth mechanism further includes instructions for aggregating similarity values for each ST section in the test video and providing aggregated similarity values in response thereto. The fourth mechanism further includes instructions for localizing the action in the test video based on the aggregated similarity values.

Hence, this embodiment provides a system for enabling high-speed real-time video action recognition and localization via use of preexisting motion vectors or other motion field information, which are often byproducts of modern video compression schemes. As discussed more fully below, leveraging precomputed motion vectors and employing unique mechanisms for computing motion-similarity values facilitates high speed real-time action recognition and temporal and spatial localization without requiring prior video segmentation, alignment, or stabilization and without requiring additional computationally expensive calculations of video optical flow or motion gradients.

DESCRIPTION OF EMBODIMENTS OF THE INVENTION

For clarity, various well-known components, such as power supplies, computer operating systems, communications ports, and so on have been omitted from the figures. However, those skilled in the art with access to the present teachings will know which components to implement and how to implement them to meet the needs of a given application.

Figure 1:
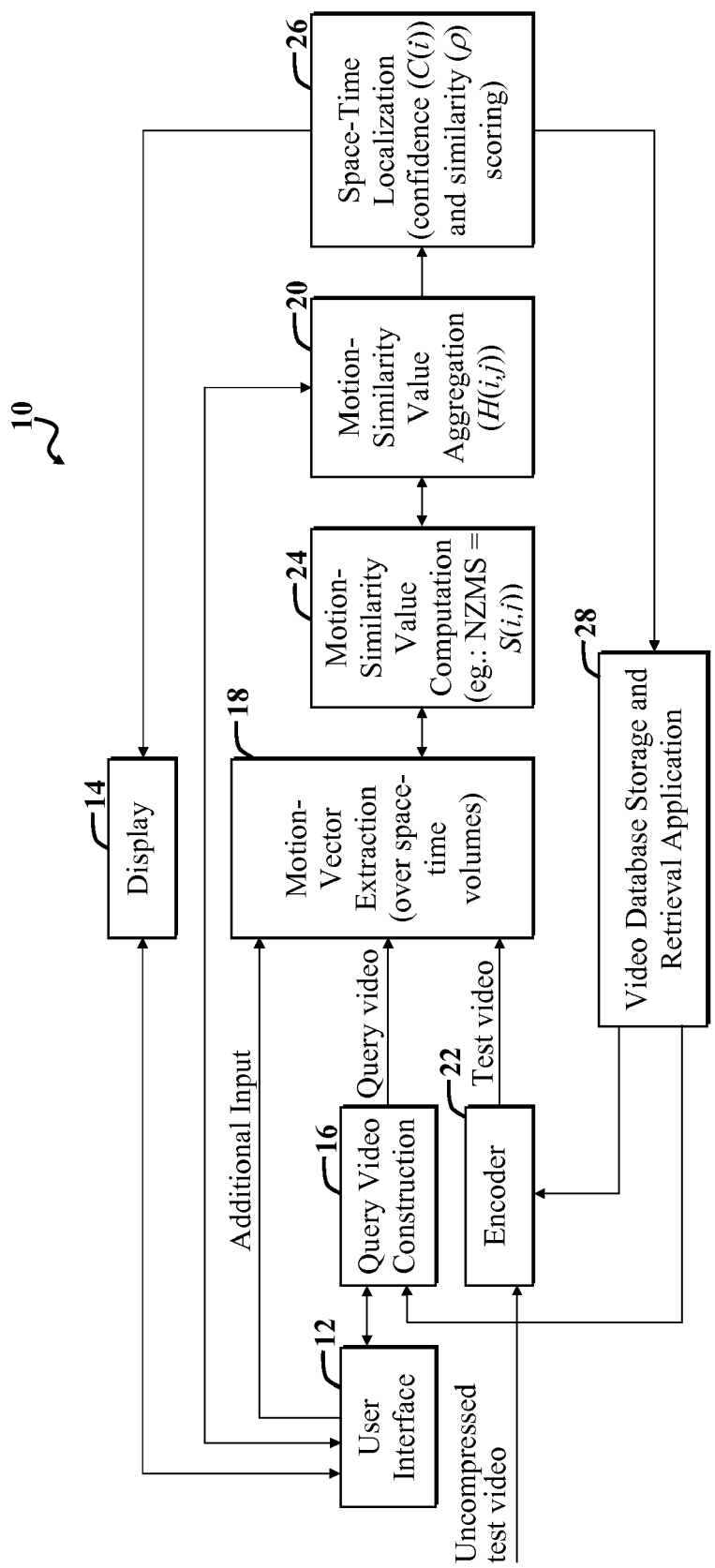
FIG. 1 is a diagram of a first example video processing system for detecting and locating an action in a test video.

FIG. 1 is a diagram of a first example video processing system 10 for detecting and locating an action in a test video. For the purposes of the present discussion, a test video or test video sequence may be any video in which a particular action is to be recognized and/or located. A video may be any sequence of frames. Similarly, a video sub-sequence may be any portion or subset of another video. A query video sequence may be any video representative of an action to be found in a test video.

A frame may be any set of data that includes plural pixels of information, where a pixel may be a value associated with a data point or other basic element or unit of an image or frame. An image frame may be any collection of data points or pixels that are associated with an image or something to be displayed or viewed. An image may be any thing or representation of a thing that can be viewed.

The system 10 includes a user interface 12 in communication with a display 14, a query-video construction module 16, a motion-vector extraction module 18, and a similarity-value aggregation module 20. The motion-vector extraction module 18 is further coupled to the query-video construction module 16, a video encoder 22, and a similarity-value computation module 24. The similarity-value computation module 24 is further coupled to the similarity-value aggregation module 20, which is further coupled to a space-time localization module 26. The space-time localization module 26 is further coupled to the display 14. Although specific components and interconnections are shown in FIG. 1, they are merely illustrative of one possible design. Other designs can omit, include or modify the components and interconnections from those shown in FIG. 1 and still remain within the scope of the claims. For example, test video can be pre-encoded as input or as stored in video database 28 so that encoder 22 may not be necessary. Many other variations are possible.

In operation, the encoder 22 receives uncompressed test video as input. The uncompressed test video may originate from various sources, such as a video receiver, video camera, computer hard drive, and so on. The encoder 22 compresses the test video and provides compressed test video to the motion-vector extraction module 18. In the present example embodiment, the encoder implements MPEG-2 (Moving Picture Expert Group-2) encoding, and outputs compressed video data, including coefficients and accompanying motion vectors. However, certain embodiments of the present invention may be readily adapted for use with other types of present or future video encoding systems and methodologies, such as MPEG-4 (H.264) encoding methodologies, without undue experimentation and without departing from the scope of the present teachings.

H.264 is a digital video codec standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts Group (MPEG). The H.264 standard is also called the ISO/IEC MPEG-4 Part 10 standard or the ITU-T H.264 standard.

The compressed test video output from the encoder 22 is also called compressed-domain video. The compressed-domain refers to the state of data after it has been compressed. Generally, compressed-domain data may refer to any data that has been compressed, such as by a compression algorithm. Similarly, the term "compressed-domain action recognition" may be any process that determines or locates an action in a video based on compressed video or components or features of the compressed video.

An action that is located in a video is said to be localized. An action whose spatial position or approximate spatial position in a given set of frames is located and whose position in time in a given video is located is said to be spatially and temporarily localized or localized in space and time. The exact action sought need not be found in a video for the action to be considered localized. Localizing an action may mean to locate the action or a similar action occurring in a video or to otherwise determine similarities or degrees of similarity of an action in a query video to one or more actions in a test video at particular locations in the test video.

Generally, an action that is localized in a video is also recognized. For the purposes of the present discussion, the term "recognize an action" may mean to determine whether or not a particular action represented in a first video is represented in a second video with a predetermined likelihood or confidence level. For example, the process of determining that a given action likely occurs in a test video with a certain degree of certainty or confidence based on a predetermined criterion may be considered a type of action recognition, i.e., recognizing an action.

The test video output from the encoder 22 to the motion-vector extraction module 18 includes motion vectors. For the purposes of the present discussion, a motion vector may be any value or set of values describing movement of pixel information from one frame to another frame in a video. In the present specific embodiment, each motion vector describes movement of a group of pixels, such as a macroblock or sub-block of pixels, from one frame to another frame. The motion vectors represent estimates or approximations of optical flow. In this embodiment, a macroblock may be any 16×16 grouping of pixels in a video frame, and a sub-block may be any 4×4 grouping of pixels within a macroblock. Note that other groupings of pixels may be employed without departing form the scope of the present teachings. For example, pixels may be grouped in different sized blocks, such as 4×8 groupings, or in shapes other than rectangular or square groupings.

For the purposes of the present discussion, optical flow pertains to movement of individual pixels in a video. Optical flow may be any vector or set of vectors describing the movement or change in position of each individual pixel in a frame or portion thereof from one frame to another frame, wherein each vector is applicable to an individual pixel or a group of pixels smaller than a macroblock or a sub-block of a macroblock. A frame or a portion of a frame is said to lack motion when the corresponding optical flow is zero or below a predetermined threshold and/or when motion vectors associated with the frame or portion of the frame are zero or otherwise indicate negligible motion.

A user may employ the user interface 12 to control or adjust the operation of the query-video construction module 16. The query-video construction module 16 includes instructions for facilitating generating a query video, which is a compressed video that includes motion vectors, that is provided to the motion-vector extraction module 18. The query-video construction module 16 may be implemented via various devices, such as video cameras, computer systems coupled to a Web camera, and so on. Furthermore, any uncompressed video produced via the query-video construction module 16 may be routed through the encoder 22 for compression in certain embodiments.

In the present embodiment, the query video output by the query-video construction module 16 includes an action to be located in one or more test videos output by the encoder 22. An action is said to occur in a test video if it is represented in the test video and matched to the action in the query video. For example, an action of a person running is said to occur in a test video if the test video includes an action of a person running that is correlated to within a threshold amount to a localized action in the query video. Note that different embodiments the correlated action can be of arbitrary size within each video and of arbitrary duration and translational, rotational or scalar movement.

A test video may be any video in which a particular action is to be located. A query video sequence may be any video representative of an action to be found in a test video. Similarly, a query video may be any video employed to conduct any type of search or to pose any type of query. For example, a video containing specific motion sought in a test video is a type of query video.

The motion-vector extraction module 18 includes instructions for extracting or otherwise obtaining motion vectors for each frame of the query video and the test video. Additional input from the user interface 12 may limit extraction of motion vectors to certain regions of the test video and the query video. For example, the user may know that the action specified by the query video, i.e., the queried action, occurs somewhere in the top left corner of the test video. The user may then employ the user interface 12 to provide corresponding additional input, such as input that specifies a Region Of Interest (ROI), to the motion-vector extraction module 18 to limit computations to the top left corner of the test video. Limiting the extraction of the motion vectors also limits Space-Time (ST) regions in the test video for which to search for a video that matches the query video. Hence, the additional input, such as input indicating where an action is occurring in a frame, could be used to limit searches for actions to particular parts of a frame.

For the purposes of the present discussion, an ST volume or region of a video represent three-dimensional portions of a video, wherein the portions have two spatial dimensions and one temporal dimension. For example, a T-length block of consecutive video frames of N×M pixels may be considered an ST volume with dimensions N×M×T. The spatial dimensions of an ST volume may correspond to all or part of a frame.

Additional examples of additional inputs include input specifying that a camera was not moving when a video was taken; that a video contains a certain type of noise that should be first removed; that a given action represents motion occurring at a certain rate across a video display; and so on may be employed to streamline calculations.

The motion-vector extraction module 18 uses motion vectors as an estimate of optical flow. Generally, motion vectors are by-products of many modern video compression techniques, such as H.264 video compression techniques.

Transform coefficients, such as Discrete Cosine Transform (DCT) coefficients that accompany video compressed via certain MPEG techniques, such as H.264, may be employed to calculate a confidence measure that estimates how accurately motion vectors accurately represent optical flow or otherwise estimates how likely a given motion vector accurately represents optical flow for a given block of pixels. Exact details for estimating optical flow and confidence maps associated with optical flow are application specific. Those skilled in the art with access to the present teachings may readily choose and implement an appropriate motion-vector filtering scheme to meet the needs of a given application without undue experimentation. For example, methods similar to those used in a paper by M. T. Coimbra and M. Davies, entitled "Approximating Optical Flow Within the MPEG-2 Compressed Domain," and published in *IEEE Transactions on Circuits and Systems for Video Technology*, Vol. 15., No. 1, pages 103-104, 2005, may be employed to compute a coarse estimate and confidence map of optical flow for use with certain embodiments. The confidence map represents a set of confidence values, wherein one or more of the confidence values are associated with each optical flow estimate or motion vector.

The motion-vector extraction module 18 includes instructions for performing motion-vector thresholding. Motion-vector thresholding involves discarding motion vectors or other optical flow estimates that are not associated with sufficiently high (or certain) confidence measures. This removes unreliable motion vectors or other optical flow estimates and greatly improves the performance of the system 10.

For the purposes of the present discussion, a confidence measure or score may be any measure or other indication that indicates a degree of certainty of or confidence that a given condition or fact that is being scored is occurring, has occurred, is likely to have occurred, is accurate, or meets some other criteria or requirement. For example, a confidence score pertaining to a motion vector may indicate how accurately the motion vector represents or estimates optical flow of the pixels in a given macroblock. Similarly, a confidence score pertaining to a queried action in a video may indicate a degree of confidence or certainty that the queried action exists in the video or in a portion thereof.

A confidence map may be any set of confidence values. For example, the confidence map used by the motion-vector extraction module 18 includes a set of confidence values associated with motion vectors for individual pixels or groupings of pixels, where each confidence value indicates a degree of certainty or confidence that the associated motion vector accurately describes the movement of the associated pixel or group of pixels from one frame to another frame. For the purposes of the present discussion, a motion vector associated with a given group of pixels, such as a macroblock, is also called an optical flow estimate for a given pixel in the group or macroblock of pixels.

In the present embodiment, the motion-vector extraction module 18 may only extract motion vectors corresponding to predetermined Space-Time (ST) volumes of the test video.

The similarity-value computation module 24 includes instructions for computing motion-similarity values ($S(i,j)$) representative of the similarity between a given frame of the query video and a given frame of the test video. Alternatively, the motion-similarity values ($S(i,j)$) are calculated based on a given frame of the query video and a given portion of a given frame of the test video. The motion-similarity values ($S(i,j)$) are also called Non-Zero Motion block Similarity (NZMS) values. In the present embodiment, the NZMS values ($S(i,j)$) are calculated via a special measure of similarity, as discussed more fully below.

For the purposes of the present discussion, a similarity value may be any number, figure, or other mechanism that is usable to quantify a degree to which a first process or thing matches or is otherwise similar to a second process or thing. For example, a similarity value may indicate that certain pixels in a first video frame are associated with pixel movement that is very similar or not very similar to pixel movement associated with certain pixels in a second video frame.

In the present example embodiment, frames of both the query video and the test video have a spatial dimension of N×M macroblocks. Computations are performed at the macroblock level rather than at the pixel level in the present embodiment. Note that the test video may exhibit frames with dimensions other than N×M macroblocks without departing from the scope of the present teachings, as discussed more fully below.

A motion field centered at macroblock (n, m) associated with an i-th test frame is denoted $\vec{V}_i^{test}(n, m)$. The integer coordinates (n, m) identify the macroblock that is at the intersection of the n-th column and m-th row of macroblocks in a given frame. Similarly, a motion field associated with a j-th query frame is denoted $\vec{V}_j^{query}(n, m)$. In general, i is an integer index identifying a particular test frame in the test video; j is an integer index identifying a particular query frame in the query video; and n and m are integer coordinates identifying a location of a macroblock in a frame.

The NZMS value representing the motion similarity between $\vec{V}_i^{test}(n, m)$ and $\vec{V}_j^{query}(n, m)$ is given by the following equation:

$$S(i, j) = \frac{1}{Z(i, j)} \sum_{n=1}^{N} \sum_{m=1}^{M} d\left(\vec{V}_i^{test}(n, m), \vec{V}_j^{query}(n, m)\right), \quad [1]$$

where N and M indicate the horizontal and vertical dimensions, respectively, in terms of macroblocks, of a frame of the test video and a frame of the query video; where $Z(i, j)$ is a normalizing factor given by the following equation:

$$Z(i,j) = \sum_{n=1}^{N} \sum_{m=1}^{M} 1 [\|\vec{V}_i^{test}(n,m)\| > 0 \text{ or } \|\vec{V}_j^{query}(n,m)\| > 0]; \quad [2]$$

and where the function $d(\vec{V}_1, \vec{V}_2)$ is given by the following equation:

$$d(\vec{V}_1, \vec{V}_2) = \frac{\langle\langle \vec{V}_1, \vec{V}_2 \rangle\rangle_+}{\|\vec{V}_1\| \cdot \|\vec{V}_2\|} \cdot \min\left(\frac{\|\vec{V}_1\|}{\|\vec{V}_2\|}, \frac{\|\vec{V}_2\|}{\|\vec{V}_1\|}\right) =, \quad [3]$$

$$d(\vec{V}_1, \vec{V}_2) = \frac{\langle\langle \vec{V}_1, \vec{V}_2 \rangle\rangle_+}{\max(\|\vec{V}_1\|, \|\vec{V}_2\|)},$$

$$\forall (\|\vec{V}_1\| > 0, \|\vec{V}_2\| > 0); d(\vec{V}_1, \vec{V}_2) = 0$$

otherwise.

Hence, macroblocks in the query video and the test video that are characterized by zero-valued motion vectors are ignored in the computation of NZMS values. Consequently, zero-motion regions in both the query and test videos are not penalized or otherwise associated with lower NZMS values.

For the purposes of the present discussion, a test frame may be a frame in a test video. Similarly, a query frame may be a frame in a query video.

A test video may be any sequence of frames within which to search for a query video. A query video may be any sequence of frames exhibiting a feature, such as a particular motion, that is to be searched for in a test video.

The similarity-value aggregation module 20 includes instructions for aggregating motion-similarity values ($S(i,j)$) computed by the similarity-value computation module 24. The aggregation module 20 performs the aggregation by applying a filter to the motion-similarity values ($S(i,j)$), wherein the filter is characterized by a special transfer function ($H(i,j)$), also called a kernel. Certain parameters of ($H(i,j)$) may be adjusted via the user interface 12, as discussed more fully below. Use of ($H(i,j)$) facilitates aggregating the motion-similarity values ($S(i,j)$) while accounting for temporal dependencies of the motion-similarity values ($S(i,j)$).

For the purposes of the present discussion, the term to "aggregate similarity values" may mean to employ the similarity values or characteristics thereof to determine another value. For example, the process of convolving a similarity value ($S(i,j)$) with a T×T filter ($H(i,j)$) to yield $Sa(i,j)$ may be considered aggregating similarity values over a T-length sequence of frames of a test video.

Computations performed by the similarity-value aggregation module 20 yield aggregated motion-similarity values ($Sa(i,j)$). The aggregated motion-similarity values ($Sa(i,j)$) indicate how similar a predetermined length video sequence that is centered at frame i of a test video is to a video sequence of similar length centered at frame j of a query video.

Aggregated motion-similarity values ($Sa(i,j)$) are determined by convolving the motion-similarity values ($S(i,j)$) with the T×T filter kernel ($H(i,j)$) in accordance with the following equation:

$$S_a(i,j) = (S*H)(i,j), \quad [4]$$

where the T×T filter kernel ($H(i,j)$) is given by the following equation:

$$H(i, j) = \sum_{r \in R} e^{-\alpha(r-1)\chi(i,rj)}, -T/2 \leq i, j \leq T/2, \quad [5]$$

where R is a set of action rates (r) to allow for, i.e. over which to perform the summation given in equation (5); $\alpha$ is a user-configurable parameter ($\alpha >= 1$) that is used to adjust tolerance to differences in rates between a test video and a query video frame; and where $$\chi(i, rj) = \begin{cases} 1 & \text{if } i = \text{sign}(rj) \cdot \lfloor |rj| \rfloor \\ 0 & \text{otherwise} \end{cases} \quad [6]$$

The parameter ($\alpha$) is may be adjusted by a user via the user interface 12. In general, as $\alpha$ increases, the tolerance of the filter described by the kernel ($H(i,j)$) of equation (5) to changes in rates of actions decreases. A graphical representation of an example ($H(i,j)$) and its effects on an example query video and test video are discussed more fully below. Note that use of the parameter ($\alpha$) enables fine tuning of the system 10 to control how sensitive the system 10 is to motions or actions occurring at different rates in the query video and the test video. For example, $\alpha$ may be adjusted to enable the system 10 to detect an action in the test video, such as an action corresponding to a person slowly moon walking in the query video, even if the person is moon walking more quickly in the test video than in the query video.

The rate (r) of an action in a video relates to or is estimated by the magnitudes of motion vectors associated with macroblocks or pixels in a sequence of video frames that are associated with the action. The filter described by the kernel $H(i,j)$, also called a transfer function, can be interpreted as a bandpass filter that passes actions in the test video that occur at approximately the same rate as in the query video. Note that the width of the bandpass filter described by the kernel $H(i,j)$ can represent the tolerance of the filter to the variations in differences in rates between rates of an action(s) in a query video and rates of an action(s) in the test video, such that larger filter tolerances will allow more variation in rates at which an action(s) occurs in a test video as compared to rates at which an action(s) occurs in a query video.

In the present example embodiment, the space-time localization module 26 includes instructions for employing the aggregated motion-similarity values ($S\alpha(i,j)$) to determine one or more confidence measures ($C(n,m,i)$). The confidence measure(s) ($C(n,m,i)$) indicates the likelihood or degree of confidence or certainty that the queried action occurs at frame i of the test video, centered at the spatial location of (n,m) in the test video. The queried action contained in the query video is said to be localized at a particular location in the test video when the confidence measure ($C(n,m,i)$) exceeds a predetermined value at the particular location in the test video. Hence, the space-time localization module 26 may compute a measure of confidence ($C(n,m,i)$) indicative of how likely it is (or otherwise indicative of a level of certainty or confidence) that the queried action is occurring in each ST region (to the nearest macroblock and frame) in the test video.

In certain implementations, when the spatial dimensions (N×M macroblocks) of frames in the test video match the spatial dimensions (N×M macroblocks) of frames in the query video, the spatial coordinates (n,m) may be dropped. In this case the confidence measure (C(i)) indicates a degree of confidence or certainty that action occurring in the i-th test frame matches action occurring in the query video or is otherwise from the query video. The confidence measure (C(i)) is given by the following equation:

$$C(i) = \max_{\max(i-T/2,1) \le k \le (i+T/2,Ttest), 1 \le j \le Tquery} S_a(k, j), \qquad [7]$$

where Tquery represents the number of frames in a query video; Ttest represents the number of frames in a test video or portion thereof that is being searched for an action represented in the query video; k is an integer frame counter corresponding to a given test frame; and the remaining variables and terms are as given above.

Hence, computing the confidence measure (C(i)) involves maximizing the aggregated motion-similarity values (Sα(k, j)) over all frames j of the query video and over all frames k in a temporal window of T frames (T-length temporal), where T<=Ttest, and where the T-length temporal window is centered at frame i of the test video.

Note that if a T-length sequence of test video frames centered at frame k matches well with the Tquery-length sequence of query video frames, i.e., the query video, then C(i) will be relatively large, and all frames in the T-length portion of the test video will have similar confidence measures or scores, as given in equation (7).

Those skilled in the art with access to the present teachings may readily modify equation (7) to determine a measure for C(n,m,i), which may be used when the test video and query video do not have the same spatial dimensions. For example, the query video, also called a query video template, may be visualized as representing an ST volume that is moved about all ST locations in the test video to compute a score for each ST volume in accordance with equation (7).

ST volumes of the test video that are associated with higher values of C(n,m,i) are considered more likely to contain the queried action. Each confidence measure C(n,m,i) is associated with an ST volume, called an action confidence volume, which is centered at frame i of the test video; has the dimensions of the query video; and is centered at the macroblock identified by the integer coordinates (n,m). Using the confidence scores C(n,m,i) or C(i) to localize an action occurring in a test video is also called "thresholding the confidence map" to localize the action. For the purposes of the present discussion, ST-volumes or regions in the test video with confidence scores exceeding a predetermined threshold may be considered matching regions, i.e., regions with actions matching one or more actions in the query video.

While computing C(n,m,i) for each ST-volume of a test video may seem computationally complex, use of compressed-domain processing and motion vectors as coarse estimates or approximations of optical flow enables high speed real-time implementations of such embodiments. Note that various processes and operations performed by the various modules 12-26 of the system 10 may be performed in parallel without departing from the scope of the present teachings.

A localized action in a test video may be highlighted in real time and displayed via the display 14. Exact details for highlighting and displaying localized action are application specific. Those skilled in the art with access to the present teachings may readily choose and implement a suitable method for highlighting localized actions in a test video without undue experimentation.

For the purposes of the present discussion, real-time detection or localization may be any process that performs detection and/or localization quickly enough to enable detection or localization of an action in a video while the video of the action is playing.

The space-time localization module 26 may further include instructions for computing a similarity score (ρ) indicative of the overall similarity (action-similarity) between the query video and the test video, which is indicative of how similar actions that occur in the query video are to actions that occur in the test video on average. An example similarity score (ρ), which is also a type of confidence score, is given by the following equation:

$$\rho = \frac{1}{L} \sum_{i=1}^{Ttest} \eta(i) \left( \max_{n,m} C(n, m, i) \right), \qquad [8]$$

where L is a normalization factor given by the following equation:

$$L = \sum_{i=1}^{Ttest} \eta(i), \qquad [9]$$

where η(i) is an indicator function that returns one if at least T frames in a 2T-length temporal neighborhood centered at frame i have significant motion and returns zero otherwise, where T is a predetermined number of frames used for the purposes of computing η(i). A frame is asserted to have significant motion if at least δ proportion of the macroblocks have reliable motion vectors of magnitude greater than a predetermined threshold ε.

In summary, the system 10 estimates optical flow from motion vectors via the motion-vector extraction module 18; computes frame-to-frame motion-similarity values (S(i,j)) via the similarity-value computation module 24; aggregates the similarity values (S(i,j)) via the similarity-value aggregation module 20; and then may repeat the operations associated with modules 18, 24, 20 for all ST locations in a test video to enable the ST localization module 26 to localize the queried action. Alternatively, instead of repeating functions performed by the various modules 18, 24, 20, each module 18, 24, 20 may initially compute values for all applicable ST locations. Hence, the system 10 performs real-time compressed-domain action recognition and localization using motion vectors to estimate optical flow.

Note that the system 10 of FIG. 1 represents an example embodiment only. For example, various modules may be omitted, reordered, incorporated within each other, performed in parallel, and so on, without departing from the scope of the present teachings. For example, the query-video construction module 16 and the encoder 22 of FIG. 1 may be omitted.

In embodiments lacking the query-video construction module 16, the motion-vector extraction module 18 receives a query video from another source or otherwise includes instructions for creating a query video in response to user input from a user interface. Similarly, in embodiments lacking the encoder 22, the motion-vector extraction module 18 receives test video from another source. In addition, while the present embodiment operates on compressed video, any video with accessible motion vectors may be processed to detect and localize actions in accordance with the present teachings.

While the present embodiment uses motion vectors as estimates of optical flow, values other than motion vectors or optical flow vectors may be employed without departing from the scope of the present teachings. In general, any motion field information may be employed to compute motion-similarity values and to detect and localize actions in a video. For the purposes of the present discussion, motion field information may be any data, such as one or more vectors, that describes movement of pixel information pertaining to one or more groups of pixels from a first frame to another frame. A group of pixels may be any collection of two or more pixels. Examples of a group of pixels include a 16×16 macroblock or a 4×4 sub-block as defined in accordance with H.264 standards. Motion field information and optical flow data may contain direction and/or magnitude information. Magnitude information may related to the speed or rate of an associated action and may indicate spatially how far pixel information moves between frames.

Motion compensation may be any description describing a picture in terms of where each section of that picture came from in a previous picture. Motion compensation is related to optical flow. However, motion compensation generally describes movement of blocks, such as macroblocks of an image frame (instead of individual pixels) from one frame to another frame. The term "motion field" may be used interchangeably with "motion compensation" herein.

The system 10 further includes a video database storage and retrieval application 28, which is coupled between the space-time localization module 26 and the query video construction module 16 and encoder module 22. The a video database storage and retrieval application 28 includes instructions for organizing, retrieving, or grouping videos in/from large collections of videos stored in the video database storage and retrieval application 28, based on similarity values output from the space-time localization module 26. For example, the video database storage and retrieval application 28 may store several videos, which are to be searched for the occurrence of a person running. The video database storage and retrieval application 28 may submit a query video depicting a person running to the query video construction module 16, and may submit test videos to the encoder 22. Alternatively, the query video and test video may be submitted directly to the motion-vector extraction module 18. The video database storage and retrieval application 28 then employs a predetermined search algorithm to selectively search the video database, employing the system 10 to test videos in the database (maintained by the video database storage and retrieval application 28) to identify occurrences the person running, i.e., to identify occurrences of a match between the query video and test videos. After videos are identified, they may be sorted, grouped, retrieved, transferred to another application, and so on.

Note that the database organization/retrieval application 28 may employ other action-recognition systems other than the one disclosed in FIG. 1 without departing from the scope of the present teachings. In general, the video database storage and retrieval application 28 includes instructions to enable selective retrieval of videos from a video database, wherein the retrieved videos contain actions that match a query video to a predetermined degree or confidence level. The action-recognition or action-localization system 10 may be employed to facilitate performing various database operations, such as sorting or grouping videos, based on the actions contained in the videos. The database organization/retrieval application 28 may be implemented via one or more hardware and/or software applications and/or modules. In the present embodiment, the database organization/retrieval application 28 is implemented via a software application running on a personal computer in communication with a video storage device or system.

Figure 2:
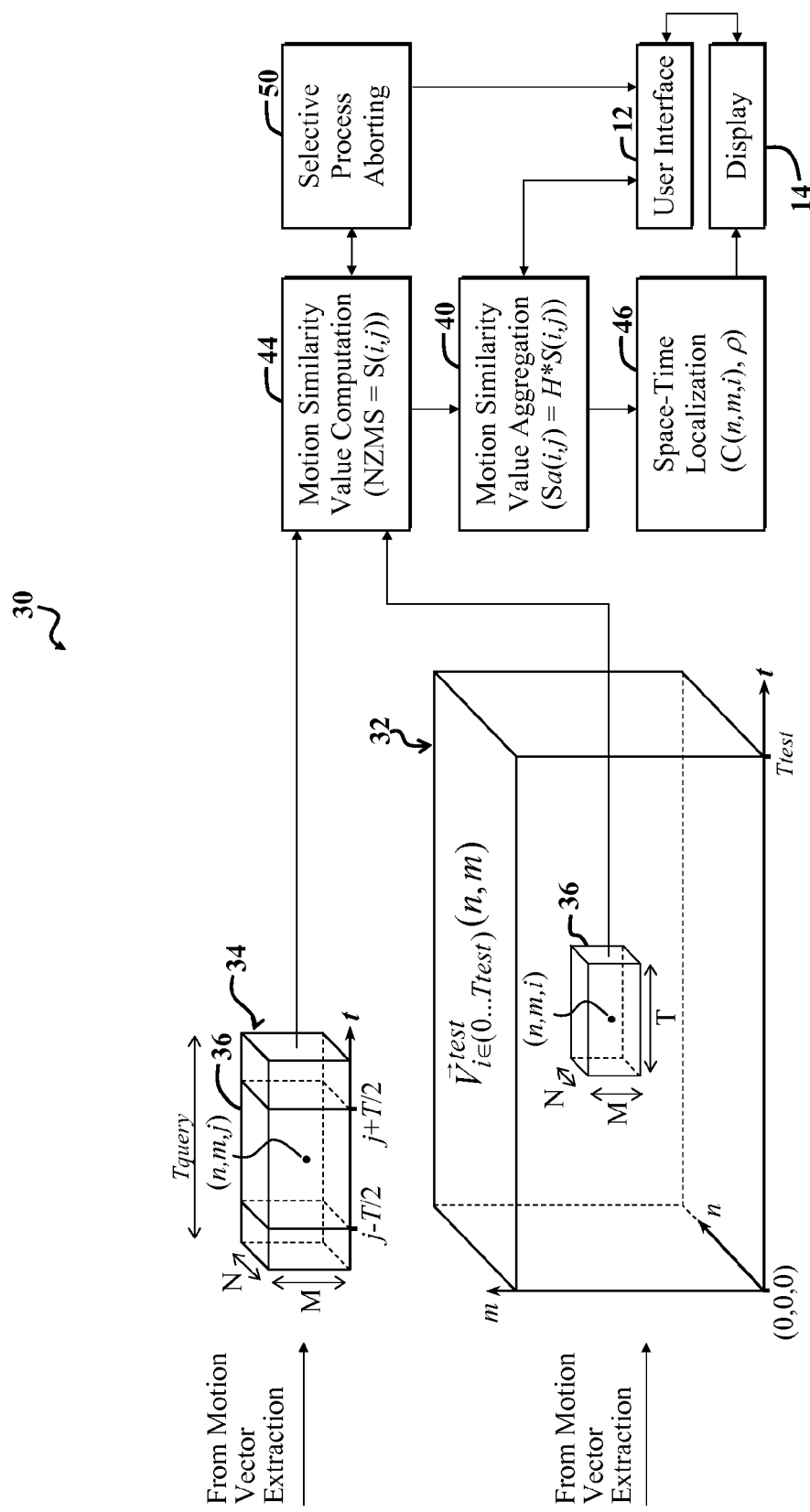
FIG. 2 is a diagram of a second example video processing system for detecting and locating an action in a test video.

FIG. 2 is a diagram of a second example video processing system 30 for detecting and locating an action in a test video 32. The action sought in the test video 32 is contained in a query video 34 and is called the queried action.

The second video processing system 30 includes a modified similarity-value computation module 44, which receives the test video 32 and the query video 34 as input. The modified similarity-value computation module 44 is coupled to a modified similarity-value aggregation module 40 and a process-aborting module 50. The modified similarity-value aggregation module 40 is coupled to a modified space-time localization module 46, which is coupled to the display 14. The display is coupled to the user interface 12, which is coupled to the modified similarity-value aggregation module 40 and the process-aborting module 50.

The operation of second video processing system 30 is similar to the first video processing system 10 of FIG. 1 with various exceptions. For example, the second video processing system 30 is shown processing the test video 32 and the query video 34, which have different spatial dimensions. In addition, functionality for extracting or obtaining motion vectors from the test video 32 and the query video is incorporated into the modified similarity-value computation module 44 as needed for a given implementation.

In the present embodiment, the modified similarity-value computation module 44 obtains motion vectors describing a queried action in a T-length query-video ST region 36 and obtains motion vectors describing all frames of the test video 32. The query video 34 and corresponding query-video ST region 36 have dimensions of N×M macroblocks, which are 16×16 blocks of pixels containing 256 pixels in the present operative scenario. Blocks of other than 16×16 pixels may be employed without departing from the scope of the present teachings. For example sub-blocks of 4×4 pixels may be employed.

The modified similarity-value computation module 44 includes instructions for computing similarity values for all T-length ST regions 36 of the test video 32 using the corresponding T-length query-video ST region 36, which is centered at frame j of the query video 34. While in the present embodiment, the query-video ST region 36 is shown as a sub-set of the query video 34, in practice the length of the query-video ST region 36 is often set to equal the entire length of the query video (Tquery) such that T=Tquery.

As discussed above, operations of the modified similarity-value computation module 44 can be visualized as sliding or moving the T-length query-video ST region 36 over all ST-locations in the Ttest-length test video 32 to arrive at various motion-similarity values ($S(i,j)$).

Values for each ST-region 36 are then aggregated via the modified similarity-value aggregation module 40 to arrive at various aggregated motion-similarity values ($Sa(i,j)$), which may be computed in accordance with equation (4). The modified space-time localization module 46 then computes confidence measures $C(n,m,i)$ for each ST-location 36 of the test video 32, where each ST-location 36 is centered at the macroblock of the test video 32 identified by the macroblock coordinates $(n,m)$. The confidence measures $C(n,m,i)$ may be determined in accordance with equation (7). In the present embodiment, the modified space-time localization module 46 also includes instructions for computing an overall similarity value ($\rho$) comparing the motion similarity of the query video 34 to the test video 32 in accordance with equation (8).

In general, the ST-locations 36 of the test video 32 with the highest confidence measures are considered most likely to contain the queried action represented by the query-video ST-region 36 of the query video 34. Hence, the modified space-time localization module 46 facilitates locating, in space and time, the queried action 36 in the test video 32.

The process-aborting module 50 monitors calculations performed by the modified similarity-value computation module 44. The process-aborting module 50 includes instructions for aborting the search of the queried action in the test video 32 if it becomes clear that the query video 34 and the test video 32 have insufficient similarities, such that, for example, all NZMS values are below a predetermined threshold. In this case, processes performed by the aggregation module 40 and space-time localization module 46 are aborted. A corresponding message may then be displayed via the display 14 indicating that the queried action was not found in the test video 32. This may accelerate the operation of the second example video processing system 30.

The process-aborting module 50 further includes instructions enabling the process-aborting module 50 to be selectively deactivated, or enabling the sensitivity of the process-aborting module 50 to be adjusted, such as in response to user input from the user interface 12.

Note that the modified similarity-value aggregation module 40 and the space-time localization module 46 may be omitted for certain applications without departing from the scope of the present teachings. Furthermore, while specific equations (1)-(9) have been provided herein for computing similarity values, confidence measures, and so on, note that other equations, such as modified versions of equations (1)-(9), may be employed without departing from the scope of the present teachings.

Hence, given a query video 34 illustrating a particular action, the second example video processing system 30 can detect or recognize all occurrences of the queried action in a test video, such as the test video 32, and locate where and when the action occurs in the test video to the nearest macroblock and ST-region centered at a given frame i.

The second example video processing system 30 uses motion vector information to capture salient appearance-independent features of actions and then computes frame-to-frame motion-similarity values (S(i,j)) that account for differences in orientation and magnitude of motion vectors. Similarity values (S(i,j)) for each Space-Time (ST) region 36 of the test video 32 are aggregated over time.

Use of motion vectors and novel computations of similarity values facilitates performing real-time localization of actions in space and time without requiring prior segmentation or temporal or spatial alignment of the test video 32.

While the present embodiment is shown receiving the query video 34 and the test video 32 as input, embodiments that receive motion vectors only (without accompanying video data, such as coefficients) as input may be developed and used without departing from the scope of the present teachings.

Figure 3:
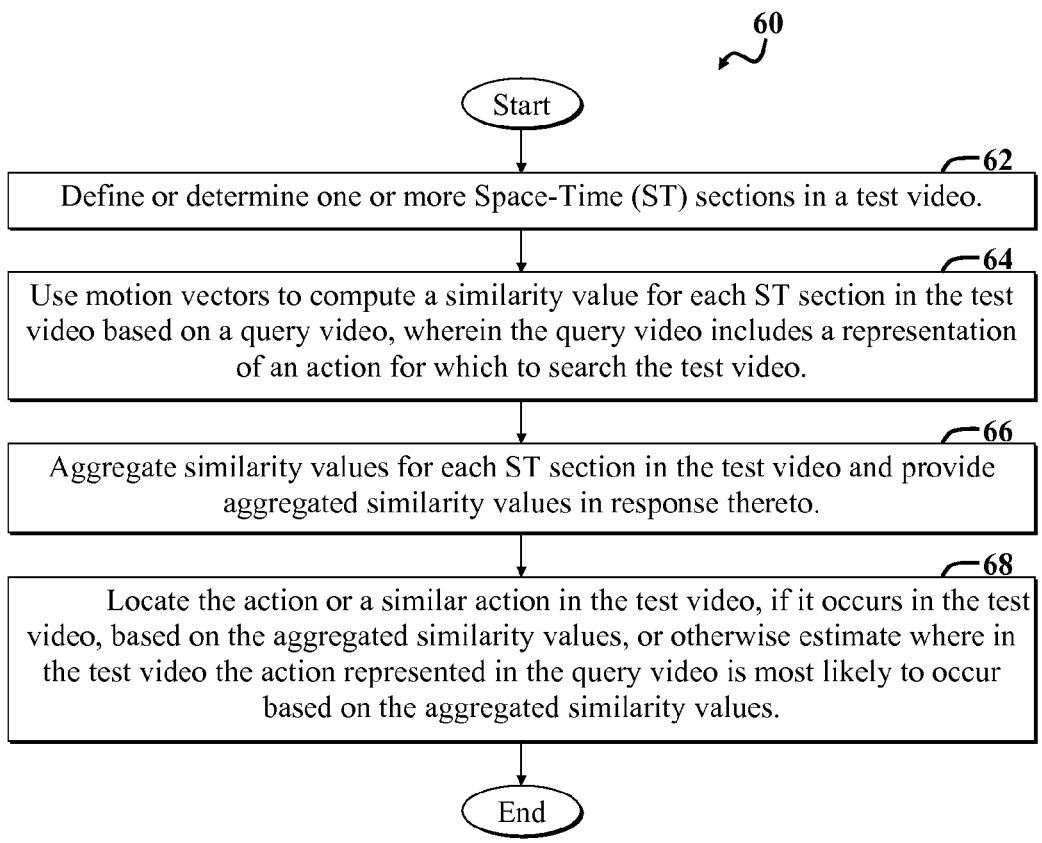
FIG. 3 is a flow diagram of a first method adapted for use with the systems of FIGS. 1 and 2.

FIG. 3 is a flow diagram of a first method 60 adapted for use with the systems 10, of FIGS. 1 and 2. The first method 60 includes a first step 62, which includes defining, partitioning, or otherwise determining one or more ST-regions in a test video.

A second step 64 includes using motion vectors to compute a similarity value for each ST section in the test video based on the query video, wherein the query video includes a representation of an action, i.e., queried action, for which to search the test video.

A third step 66 includes aggregating similarity values for each ST section in the test video and providing aggregated similarity values in response thereto.

A fourth step 68 includes locating the action or a similar action in the test video, if it occurs in the test video, based on the aggregated similarity values, or otherwise estimating where in the test video the action represented in the query video is most likely to occur (or is otherwise associated with a highest confidence measure) based on the aggregated similarity values.

Note that certain steps may be omitted from the method 60, or other steps may be added without departing from the scope of the present teachings. For example, an additional step that includes alerting a user to a located action in a test video may be included. Such an alerting step may include highlighting the action in the test video that matches an action in a query video to a predetermined degree. For example, more closely matched actions may be highlighted or outlined with different colors than less closely matched actions so that when the test video is displayed, matching actions and the degree to which they match can bee seen.

Figure 4:
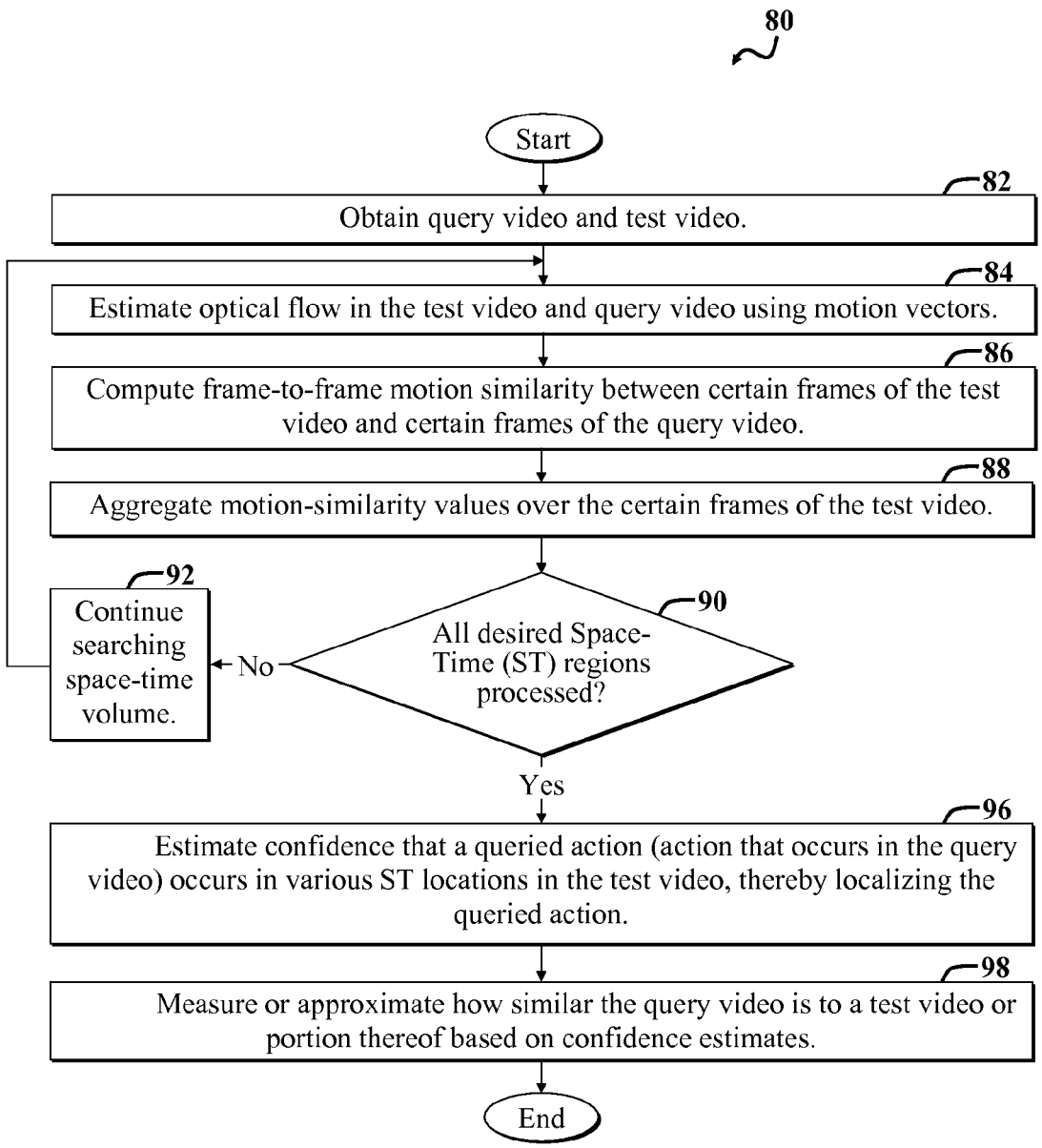
FIG. 4 is a flow diagram of a second method adapted for use with the systems of FIGS. 1 and 2.

FIG. 4 is a flow diagram of a second method 80 adapted for use with the systems of FIGS. 1 and 2. The second method 80 includes an initial obtaining step 82, which includes obtaining a query video and a test video.

Subsequently, an estimating step 84 includes estimating optical flow in the test video and the query video using motion vectors.

Next, a computing step 86 includes computing frame-to-frame motion-similarity values that describe frame-to-frame motion similarity between certain frames of the test video and certain frames of the query video.

Subsequently, an aggregating step 88 includes aggregating the motion-similarity values over the frames of the test video for which motion-similarity values have been computed.

Next, a process-checking step 90 determines whether all desired ST regions of the test video have been processed. If not all desired ST regions have been processed to determine their aggregated motion-similarity values, then a continuing step 92 is performed.

The continuing step 96 involves shifting the computations of steps 84-88 to a new set of frames of the test video that have not yet been processed. Steps 84-88 are then repeated for the new set of test frames. Steps 84-92 are repeated until the continuing step 96 determines that all desired ST regions of the test video have been processed to determine their aggregated motion-similarity values.

Subsequently, a confidence-scoring step 96 is performed. The confidence-scoring step 96 includes estimating a degree of confidence, such as via a confidence score, that the queried action (action that occurs in the query video) occurs in various ST locations in the test video, thereby localizing the queried action.

Next, an optional measuring-step 98 is performed. The measuring step 98 includes measuring or approximating how similar the query video is to a test video or portion thereof based on confidence estimates obtained in the confidence-scoring step 96.

Figure 5:
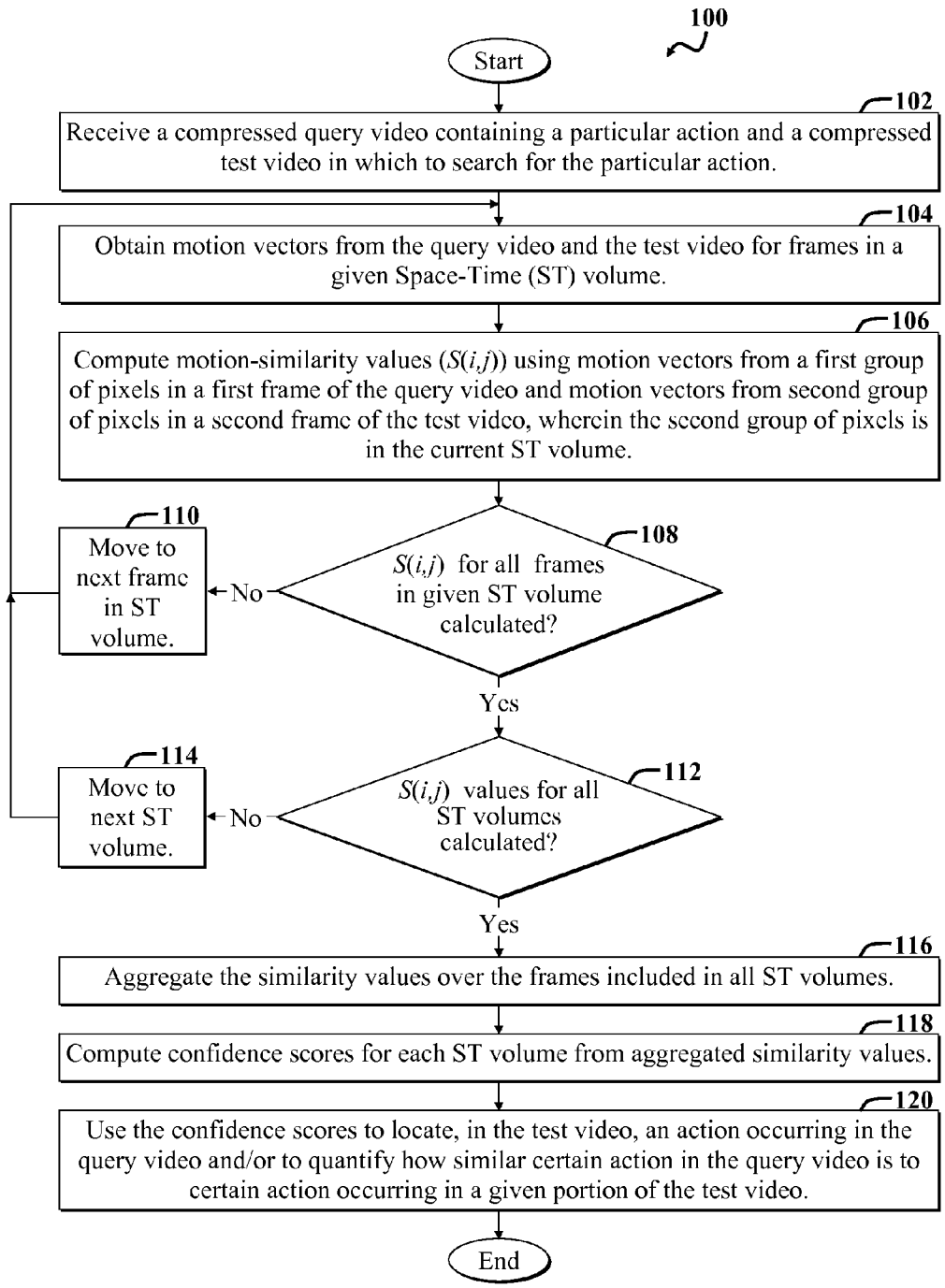
FIG. 5 is a flow diagram of a third method adapted for use with the systems of FIGS. 1 and 2.

FIG. 5 is a flow diagram of a third method 100 adapted for use with the systems 10, 30 of FIGS. 1 and 2. The third method 100 includes an initial receiving step 102, which includes receiving a compressed query video containing a particular action and a compressed test video in which to search for the particular action.

Subsequently, an optical-flow estimating step 104 includes obtaining motion vectors from the query video and the test video for frames in a given ST volume or region of the test video.

Next, a computing step includes computing motion-similarity values using motion vectors from a first group of pixels in a first frame of the query video and motion vectors from second group of pixels in a second frame of the test video, wherein the second group of pixels is in the current ST volume.

Subsequently, a first calculation-checking step 108 includes checking that all motion-similarity values in a given ST volume have been calculated. If not all motion-similarity values have been calculated, then a first moving step 110 is performed, wherein calculations are shifted to the next frame in the given ST volume of the test video. Subsequently, steps 104 and 106 are performed for the next frame. Steps 104-110 are repeated until all motion-similarity values for the given ST volume of the test video have been computed. After all motion-similarity values for the current ST volume have been calculated, a second calculation-checking step 112 is performed.

The second calculation-checking step 112 includes checking whether motion-similarity values for all desired ST-regions have been computed. If not all motion-similarity values have been computed for all desired ST-regions of the test video have been computed, then a second moving step 114 is performed, wherein calculations are shifted to the next ST volume in the test video. Steps 104-114 are repeated until all motion-similarity values for all desired ST volumes or regions of the test video have been computed, after which an aggregating step 116 is performed.

The aggregating step 116 includes aggregating the similarity values over the frames included in all ST volumes. Aggregating may include applying a filter the similarity values or otherwise performing an operation that facilitates enhancing the motion-similarity values to facilitate recognition and localization of the queried action in the test video.

Subsequently, a computing step 118 includes computing confidence scores for each ST volume based on the aggregated similarity values.

Next, a locating step 120 includes using the confidence scores to locate, in the test video, an action occurring in the query video and/or to quantify how similar the queried action is to certain action occurring in various portions of the test video.

Note that various steps of the third method 100 may be omitted or rearranged, or other steps may be added without departing from the scope of the present teachings. For example, the aggregating step 116 may be omitted in certain implementations without departing from the scope of the present teachings. In this case, action recognition and localization would be performed based on an unfiltered similarity matrix. Furthermore, note that all needed motion vectors may be extracted from the query video and test video at once initially and then used for subsequent calculations. Alternatively, motion vectors may be extracted from video as needed for a given calculation. Such modifications and other similar modifications, variations, or alternative implementations generally fall within the scope of the present teachings.

Figure 6:
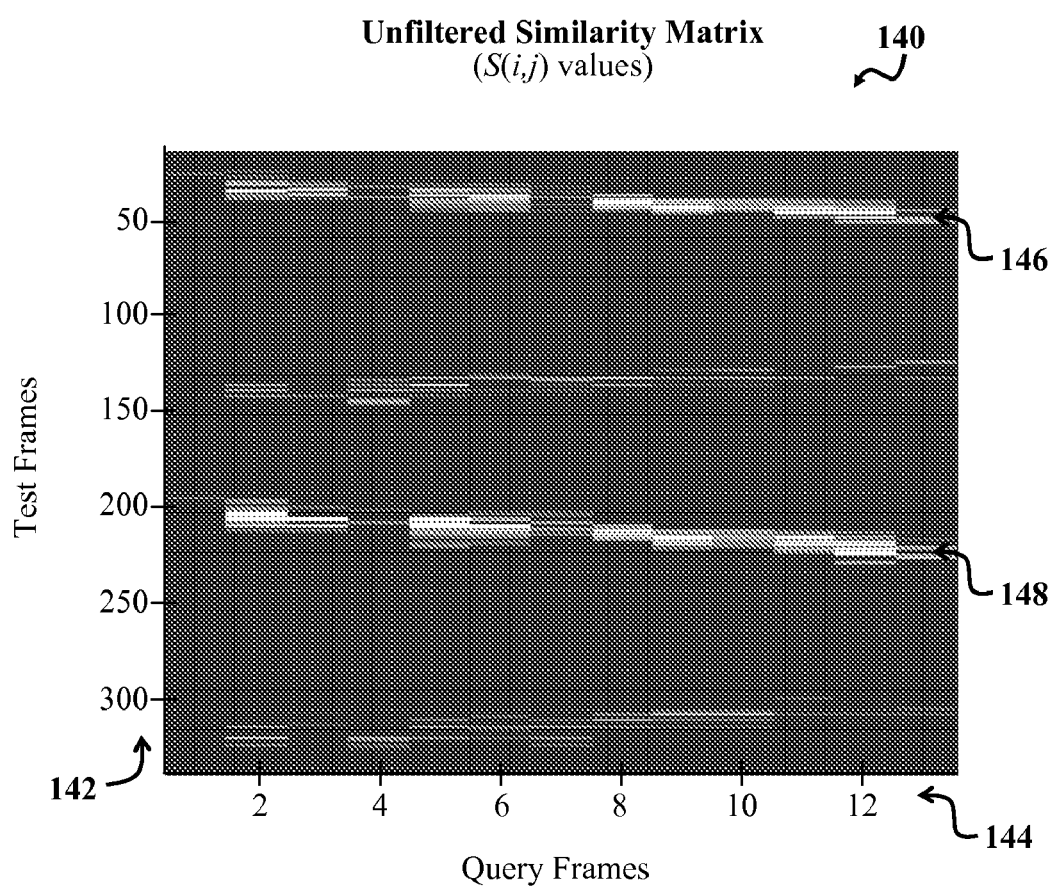
FIG. 6 is a graph illustrating an example unfiltered similarity matrix computed by the systems of FIGS. 1 and 2.

FIG. 6 is a graph illustrating an example unfiltered similarity matrix 140 computed by the systems of FIGS. 1 and 2. The similarity matrix 140 is plotted as test-frames 142 versus query frames 144, and includes, for illustrative purposes, a first bright band 146 and a second bright band 148.

The unfiltered similarity matrix 140 is also called a pre-aggregation matrix, which has not been filtered by an aggregating filter, such as the filter described by the kernel ($H(i,j)$) of equations (5)-(6).

Brighter regions, such as those comprising various diagonal bands 146, 148 represent regions associated with higher motion-similarity values ($S(i,j)$). For example, motion associated with a top diagonal band 146 suggests that action occurring in approximately frames 25-50 match a queried action occurring in frames 1-13 of the query video, since they are associated with relatively large motion-similarity values. Similarly, action or motion associated with a lower diagonal band 148 suggests that action between approximately frames 200 and 225 of the test video contain action represented in frames 1-13 of the query video (Tquery=13). The presence of near-diagonal bands 146, 148 clearly indicates that the queried action is likely taking place in the frames associated with the bright bands.

Figure 7:
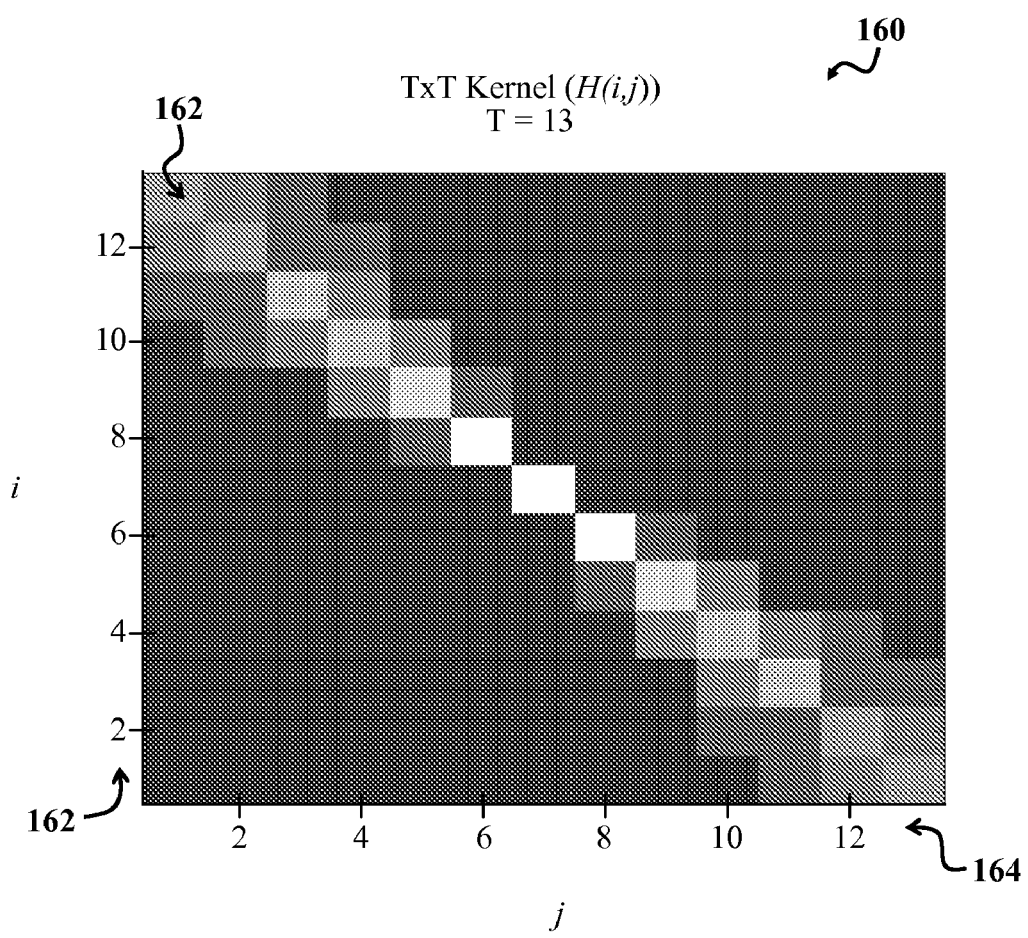
FIG. 7 is a graph illustrating a kernel that may be used to filter a similarity matrix to aggregate similarity values in the similarity matrix.

FIG. 7 is a graph illustrating a kernel 160 that may be used to filter a similarity matrix to aggregate similarity values in the similarity matrix. The kernel 160 is plotted as i-values 162 versus j-values, as the transfer function ($H(i,j)$) associated with the kernel 160 is a function of i and j, which are indexes identifying a frame of the test video and query video, respectively. The kernel 160 has dimensions of T-frames by T-frames. With reference to equation (5), the T=13 for the kernel 160 of FIG. 7. This corresponds to the length of the query video or query-video ST volume used to construct the similarity matrix 140 of FIG. 6.

As in the graph 140 of FIG. 6, brighter regions in FIG. 7 correspond to regions associated with higher values. The kernel 160 of FIG. 7 shows relatively high-valued areas 162 occurring along a diagonal extending from approximately i=13 to j=13.

Figure 8:
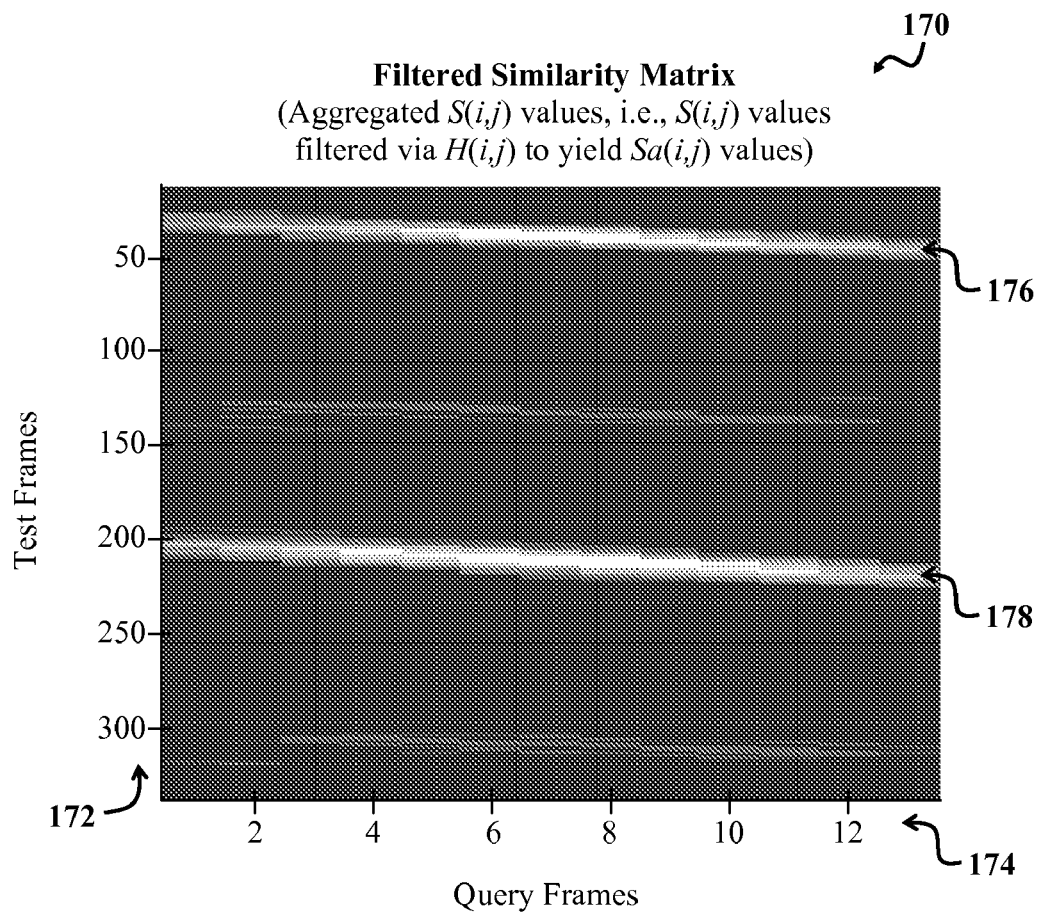
FIG. 8 is a graph illustrating a filtered version of the similarity matrix of FIG. 6 that has been filtered via the kernel of FIG. 7.

FIG. 8 is a graph illustrating a filtered version of the similarity matrix 170 of FIG. 6 that has been filtered via the kernel 160 of FIG. 7.

The filtered similarity matrix 170 is also called a post-aggregation similarity matrix and depicts aggregated similarity values ($S\alpha(i,j)$), which represent motion-similarity values ($S(i,j)$) that have been filtered via the aggregating kernel ($H(i,j)$) 160 of FIG. 6.

The diagonal bands 176, 178 FIG. 8 are smoother than the corresponding bands 146, 148 in FIG. 6. The more clearly defined smooth bands 176, 178 suggest that application of the kernel 160 of FIG. 7 facilitates detection and localization of actions in the test video.

Figure 9:
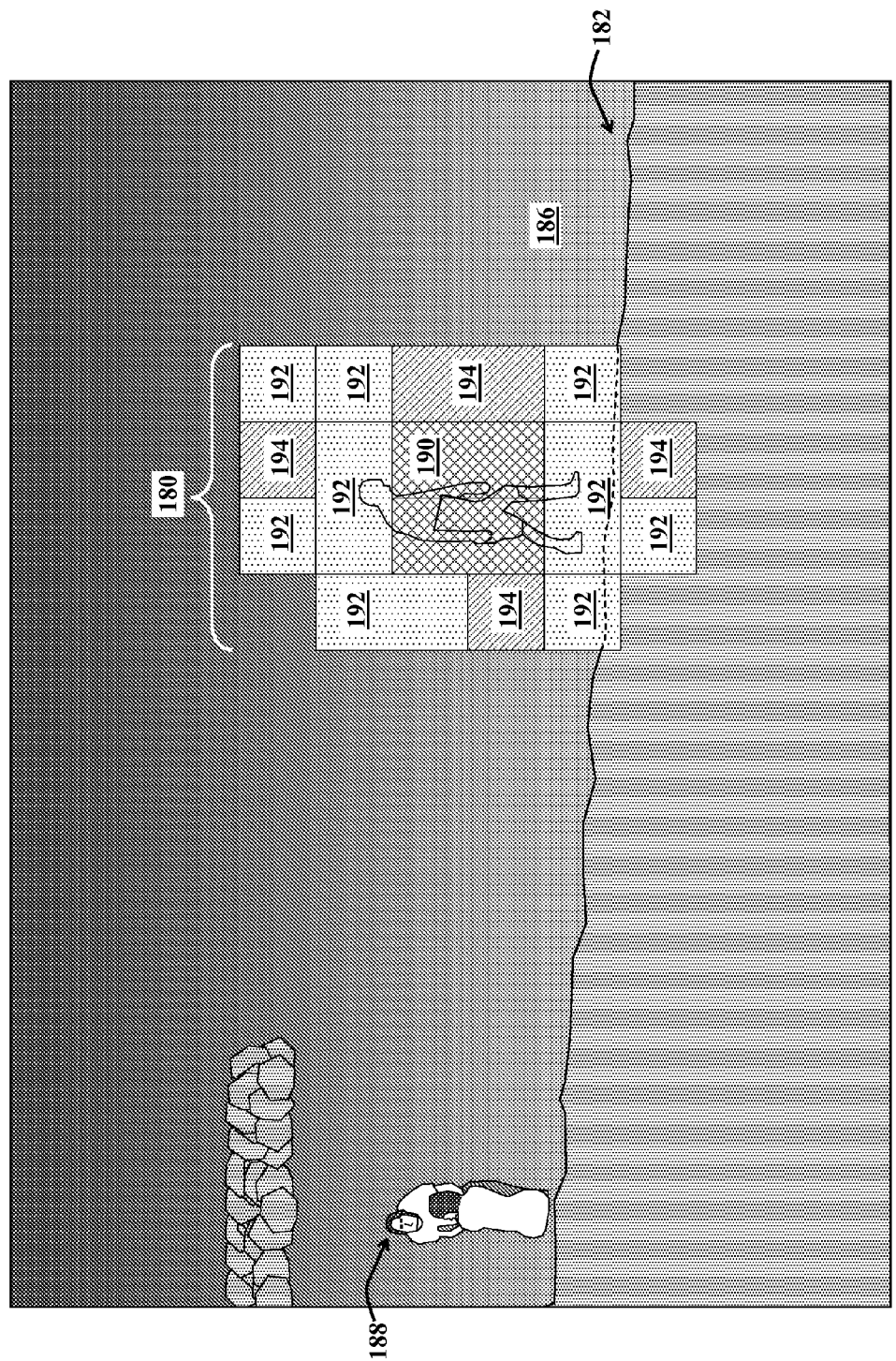
FIG. 9 shows a test video with visual indicators.

FIG. 9 shows a test video with visual indicators for macroblocks that have a high correlation to motion vectors in a test video. FIG. 9, shows a simplified frame of a video where walking person at 180 is walking along shoreline 182 between sand 184 and surf 186. Also present in the test video frame are stationary people at 188. Each macroblock that is above a threshold correlation is colored or "overlaid" with a semi-transparent shape corresponding to the macroblock. The overlay object's color is chosen so that the degree of correlation with parameters in a query video is easily discernible based on the color.

Since FIG. 9 is in grayscale, colors are indicated by different fill patterns in the blocks. In a preferred embodiment, four macroblocks 190 that overlie the central part of walking person 180 are a bright red. The semi-transparency allows the underlying video image to still be seen through the bright red tint. Other macroblocks (two pairs of macroblocks) 192 are a transparent bright yellow to indicate macroblocks with a high correlation to the query video but not as high as the red tinted macroblocks 190. Similarly, macroblocks at 194 are a bright blue while macroblocks at 196 are a dimmer blue. The brighter colors indicate a higher correlation than the dimmer colors. Thus, a simple but effective and instantly comprehensible display of correlation of specific macroblocks in a test video is shown to a human operator.

It should be apparent that FIG. 9 is a single frame from a video. In actuality the video is animated across many frames and the macroblock colors are similarly applied as the video frames change. In this manner, the macroblock colors move along with the analyzed action. Other colors (e.g., shades of progressively dimmer blue) are used to indicate macroblocks of decreasing correlation. Naturally, any other size, shape or color scheme may be used depending on the characteristic of the video that is being indicated and depending on a type of parameter (e.g., motion vector correlation) under analysis.

Hence, certain embodiments discussed herein facilitate using motion vector information to capture salient features of actions, wherein the actions are appearance independent. Frame-to-frame motion-similarity is determined in part via an NZMS measure that is based on differences in orientation and magnitude of motion vectors to compute frame-to-frame motion similarity. The ST video may be partition video into various ST sections for which the NZMS motion-similarity measures are computed and then aggregated to localize actions in the test video. Various embodiments disclosed herein, which may operate in the compressed-domain on compressed video, may facilitate high-speed real-time localization of actions.

Note that in various embodiments discussed herein, computations involving specific features of a given action are not required. For example, computations involving the color, texture, or shape associated with a particular action or thing performing the action are generally not required. However, embodiments that also use specific features of actions to facilitate action recognition or localization may be implemented without departing from the scope of the present teachings.

Although a process or module or device of embodiments disclosed herein may be presented as a single entity, such as software executing on a single machine, such software and/or modules can readily be executed on multiple machines in hardware and/or software. Furthermore, multiple different modules and/or programs of embodiments of the present invention may be implemented on one or more machines without departing from the scope thereof.

Any suitable programming language can be used to implement the routines or other instructions employed by various modules or entities. Exemplary programming languages include nesC, C++, Matlab, Mathematica, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed simultaneously in parallel, such as via pipelined processing or via parallel processors or engines.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A module or processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment is included in an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
   first means for receiving a query for a particular action, wherein the query includes a query video;
   second means for computing motion similarity between a first group of pixels in a first frame of the query video and a second group of pixels in a second frame of a video via one or more motion vectors in the query video and the test video;
   third means for providing one or more similarity values in response thereto;
   forth means for aggregating the one or more similarity values, yielding one or more aggregated similarity values in response thereto;
   fifth means for using the one or more similarity values to estimate where the particular action or version thereof occurs in the test video;
   sixth means for estimating optical flows associated with the one or more motion vectors; and
   seventh means for computing a confidence score for the particular action based on the aggregated similarity values, wherein the confidence score (C(i)) is computed in accordance with the following equation:

$$C(i) = \max_{max(i-T/2,1) \leq k \leq (i+T/2, Ttest), 1 \leq j \leq Tquery} S_a(k, j),$$

wherein Tquery represents a number of frames in the query video; Ttest represents a number of frames in the test video or portion thereof; k is a frame counter corresponding to a given test frame; i is a counter corresponding to a given test frame; j is a counter corresponding to a given query frame; C(i) is a confidence score for a T-length space-time (ST) region centered at frame i of the test video; and $S_a(k,j)$ is an aggregated similarity value estimating how similar a T-length video centered at frame k of the test video is to a T-length video centered at frame j of the query video.

2. A method comprising:
   receiving a query for a particular action, wherein the query includes a query video;
   computing motion similarity between a first group of pixels in a first frame of the query video and a second group of pixels in a second frame of a test video via one or more motion vectors in the query video and the test video;
   providing one or more similarity values in response thereto;
   aggregating the one or more similarity values, yielding one or more aggregated similarity values in response thereto;
   using the one or more similarity values to estimate where the particular action or version thereof occurs in the test video;
   estimating optical flows associated with the one or more motion vectors; and
   computing a confidence score for the particular action based on the aggregated similarity values, wherein the confidence score (C(i)) is computed in accordance with the following equation:

$$C(i) = \max_{max(i-T/2,1) \leq k \leq (i+T/2, Ttest), 1 \leq j \leq Tquery} S_a(k, j),$$

wherein Tquery represents a number of frames in the query video; Ttest represents a number of frames in the test video or portion thereof; k is a frame counter corresponding to a given test frame; i is a counter corresponding to a given test frame; j is a counter corresponding to a given query frame; C(i) is a confidence score for a T-length space-time (ST) region centered at frame i of the test video; and $S_a(k,j)$ is an aggregated similarity value estimating how similar a T-length video centered at frame k of the test video is to a T-length video centered at frame j of the query video.

3. The method of claim 2, wherein aggregating the one or more similarity values includes applying a filter to the one or more similarity values.

4. The method of claim 3, wherein the second group of pixels represent pixels in a first ST region in the test video.

5. The method of claim 2, further including performing the step of receiving and the step of computing for predetermined ST regions in the test video and providing aggregated similarity values in response thereto.

6. The method of claim 2, wherein using further includes determining where in a video the particular action is likely to occur based on the aggregated similarity values.

7. The method of claim 2, further including calculating the confidence score for each ST region in the test video.

8. The method of claim 2, further including computing a second confidence score (ρ) according to the following equation:

$$\rho = \frac{1}{L} \sum_{i=1}^{Ttest} \eta(i) \left( \max_{n,m} C(n, m, i) \right),$$

where Ttest represents a total number of frames in a test video; n and m represent integer macroblock coordinates; C(n,m,i) represents a confidence score for an ST-region centered at a macroblock with coordinates (n,m) in a test frame i; and where L is a normalization factor given by the following equation:

$$L = \sum_{i=1}^{Ttest} \eta(i),$$

where η(i) is an indicator function that returns one if at least T frames in a 2T-length temporal neighborhood centered at frame i have certain motion as defined by one or more predetermined criterion and returns zero otherwise.

9. The method of claim 2, wherein performing further includes locating the particular action contained in the query video in time in the test video.

10. The method of claim 2 further comprising locating the particular action contained in the query video in space in the test video.

11. The method of claim 2, wherein computing further includes determining a confidence map for motion vectors.

12. The method of claim 11, further including filtering values in the confidence map to keep only motion vectors that meet a predetermined criteria.

13. The method of claim 12, wherein the predetermined criteria includes an optical flow estimate associated with a motion vector exceeding a predetermined confidence value.

14. The method of claim 12, wherein filtering values further includes employing one or more discreet cosine transform (DCT) coefficients to calculate the confidence map.

15. The method of claim 2, wherein the one or more similarity values incorporate a difference in magnitudes of motion vectors in a first motion field and a second motion field corresponding to a first frame in the test video and a second frame in the query video, respectively.

16. The method of claim 15, wherein the one or more similarity values are based on one or more comparisons of a portion of a frame in the test video and a corresponding portion of a frame in the query video.

17. The method of claim 16, wherein the portion of a frame in the test video corresponds to a macroblock in the frame in the test video.

18. The method of claim 15, wherein the computing further includes ignoring macroblocks or portions of frames lacking motion or indications of motion.

19. The method of claim 15, wherein the one or more similarity values characterize a similarity between a first motion field ($\vec{V}_i^{test}(n,m)$) associated with the test video and a second motion field ($\vec{V}_j^{query}(n,m)$), where i is an integer index identifying a particular test frame in the test video; j is an integer index identifying a particular query frame in the query video; n and m are integer coordinates identifying a location of a macroblock in a frame.

20. The method of claim 19, wherein the one or more similarity values ($S(i,j)$) are determined in accordance with the following equation:

$$S(i,j) = \frac{1}{Z(i,j)} \sum_{n=1}^{N} \sum_{m=1}^{M} d\left(\vec{V}_i^{test}(n,m), \vec{V}_j^{query}(n,m)\right),$$

N and M indicate the horizontal dimensions, respectively, in terms of macroblocks, of a frame of the test video and a frame of the query video; where $Z(i,j)$ is a normalizing factor given by the following equation:

$$Z(i,j) = \sum_{n=1}^{N} \sum_{m=1}^{M} 1\left[\|\vec{V}_i^{test}(n,m)\| > 0 \text{ or } \|\vec{V}_j^{query}(n,m)\| > 0\right],$$

and the function $d(\vec{V}_1, \vec{V}_2)$ is given by the following equation:

$$d(\vec{V}_1, \vec{V}_2) = \frac{(\langle \vec{V}_1, \vec{V}_2 \rangle)_+}{\|\vec{V}_1\| \cdot \|\vec{V}_2\|} \cdot \min\left(\frac{\|\vec{V}_1\|}{\|\vec{V}_2\|}, \frac{\|\vec{V}_2\|}{\|\vec{V}_1\|}\right) =,$$

$$d(\vec{V}_1, \vec{V}_2) = \frac{(\langle \vec{V}_1, \vec{V}_2 \rangle)_+}{\max(\|\vec{V}_1\|, \|\vec{V}_2\|)}, \forall (\|\vec{V}_1\| > 0, \|\vec{V}_2\| > 0); d(\vec{V}_1, \vec{V}_2) = 0$$

otherwise.

21. The method of claim 15, wherein computing further includes employing the similarity values to determine a similarity matrix.

22. The method of claim 21, wherein computing the one or more similarity values includes convolving the similarity values with a filter ($H(i,j)$) to obtain the similarity matrix.

23. The method of claim 22, wherein the filter ($H(i,j)$) is a band-pass filter that passes actions in the test video that occur at approximately a same rate as in the query video.

24. The method of claim 23, wherein the filter ($H(i,j)$) is defined in accordance with the following equation:

$$H(i,j) = \sum_{r \in R} e^{-\alpha(r-1)\chi(i,rj)}, -T/2 \leq i, j \leq T/2,$$

where R is a set of action rates (r) used to compute ($H(i,j)$); i and j are integers identifying a frame of the test video and a frame of the query video respectively; T is a length of the filter ($H(i,j)$); $\alpha$ is a user-configurable parameter ($\alpha >= 1$) for facilitating adjusting tolerance to differences in rates between a test video and a query video frame; and where $$\chi(i, rj) = \begin{cases} 1 & \text{if } i = \text{sign}(rj) \cdot \lfloor |rj| \rfloor \\ 0 & \text{otherwise} \end{cases}.$$

25. The method of claim 21, wherein the similarity matrix is representative of a similarity between the query video and the test video.

26. An apparatus comprising:

one or more processors; and a non-transitory computer-readable medium containing instructions that, when executed by the one or more processors, cause the one or more processors to perform a method comprising:

receiving a query for a particular action, wherein the query includes a query video;

computing motion similarity between a first group of pixels in a first frame of the query video and a second group of pixels in a second frame of a test video via one or more motion vectors in the query video and the test video;

providing one or more similarity values in response thereto;

aggregating the one or more similarity values, yielding one or more aggregated similarity values in response thereto;

using the one or more similarity values to estimate where the particular action or version thereof occurs in the test video;

estimating optical flows associated with the one or more motion vectors; and computing a confidence score for the particular action based on the aggregated similarity values, wherein the confidence score (C(i)) is computed in accordance with the following equation:

$$C(i) = \max_{\max(i-T/2,1) \leq k \leq (i+T/2, Ttest), 1 \leq j \leq Tquery} S_a(k, j),$$

where Tquery represents a number of frames in the query video; Ttest represents a number of frames in the test video or portion thereof; k is a frame counter corresponding to a given test frame; i is a counter corresponding to a given test frame; j is a counter corresponding to a given query frame; C(i) is a confidence score for a T-length space-time (ST) region centered at frame i of the test video; and $S_a(k,j)$ is an aggregated similarity value estimating how similar a T-length video centered at frame k of the test video is to a T-length video centered at frame j of the query video.

27. The apparatus of claim 26, further including means for localizing the particular action in space and time in the test video.

28. The apparatus of claim 27 further comprising facilitating real-time detection and localization of multiple actions in the test video.

29. The apparatus of claim 28 further comprising facilitating real-time detection and localization of simultaneously occurring actions in the test video.

30. The apparatus of claim 26 further comprising selectively identifying one or more particular videos from among plural videos.

* * * * *